United States Patent
Ishii et al.

(10) Patent No.: US 11,379,377 B2
(45) Date of Patent: Jul. 5, 2022

(54) LOOKUP HINT INFORMATION

(71) Applicant: Arm Limited, Cambridge (GB)

(72) Inventors: Yasuo Ishii, Austin, TX (US); James David Dundas, Austin, TX (US); Chang Joo Lee, Austin, TX (US); Muhammed Umar Farooq, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/064,068

(22) Filed: Oct. 6, 2020

(65) Prior Publication Data
US 2022/0107901 A1     Apr. 7, 2022

(51) Int. Cl.
*G06F 12/0897*     (2016.01)
*G06F 12/02*     (2006.01)
*G06F 12/0891*     (2016.01)

(52) U.S. Cl.
CPC ...... *G06F 12/0897* (2013.01); *G06F 12/0238* (2013.01); *G06F 12/0891* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 2009/0222625 | A1* | 9/2009 | Ghosh ................... | G06F 9/3851 711/130 |
| 2015/0058567 | A1* | 2/2015 | Hechtman ........... | G06F 12/0811 711/122 |
| 2019/0155750 | A1* | 5/2019 | Wang ................... | G06F 12/0811 |
| 2020/0285580 | A1* | 9/2020 | Subramanian .......... | G06F 13/16 |
| 2021/0263854 | A1* | 8/2021 | Ingalls ................ | G06F 12/0888 |

OTHER PUBLICATIONS

Adiga et al., "The IBM z15 High Frequency Mainframe Branch Predictor", 2020 ACM/IEEE 47th Annual International Symposium on Computer Architecture (ISCA), May 30-Jun. 3, 2020, pp. 27-39 (13 total pages).
Bonanno et al., "Two Level Bulk Preload Branch Prediction", 2013 IEEE 19th International Symposium on High Performance Computer Architecture (HPCA), Feb. 2013, 12 pages.

* cited by examiner

*Primary Examiner* — Stephanie Wu
(74) *Attorney, Agent, or Firm* — Nixon & Vanderhye P.C.

(57) ABSTRACT

First and second-level caches are provided. Cache control circuitry performs a first-level cache lookup of the first-level cache based on a lookup address, to determine whether the first-level cache stores valid cached data corresponding to the lookup address. When lookup hint information associated with the lookup address is available, the cache control circuitry determines based on the lookup hint information whether to activate or deactivate a second-level cache lookup of the second-level cache. The lookup hint information is indicative of whether the second-level cache is predicted to store valid cached data associated with the lookup address. When the second-level cache lookup is activated, the second-level cache lookup of the second-level cache is performed based on the lookup address to determine whether the second-level cache stores valid cached data corresponding to the lookup address.

19 Claims, 5 Drawing Sheets

LOOKUP HINT INFORMATION

BACKGROUND

Technical Field

The present technique relates to the field of caches.

Technical Background

A data processing system may have one or more caches for caching information associated with a subset of addresses. The caches can be looked up based on a lookup address to identify whether any of the caches is storing valid information associated with the lookup address.

SUMMARY

At least some examples provide an apparatus comprising:
a first-level cache comprising a plurality of first-level cache entries for storing cached data;
a second-level cache comprising a plurality of second-level cache entries for storing cached data; and
cache control circuitry to:
  perform a first-level cache lookup of the first-level cache based on a lookup address, to determine whether the first-level cache stores valid cached data corresponding to the lookup address;
  when lookup hint information associated with the lookup address is available, determine based on the lookup hint information whether to activate or deactivate a second-level cache lookup of the second-level cache, the lookup hint information indicative of whether the second-level cache is predicted to store valid cached data associated with the lookup address; and
  when the second-level cache lookup is activated, perform the second-level cache lookup of the second-level cache based on the lookup address to determine whether the second-level cache stores valid cached data corresponding to the lookup address.

At least some examples provide an apparatus comprising:
first means for storing comprising a plurality of first-level cache entries for storing cached data;
second means for storing comprising a plurality of second-level cache entries for storing cached data; and
means for controlling the first means for storing and second means for storing, where the means for controlling is configured to:
  perform a first-level cache lookup of the first means for storing based on a lookup address, to determine whether the first means for storing stores valid cached data corresponding to the lookup address;
  when lookup hint information associated with the lookup address is available, determine based on the lookup hint information whether to activate or deactivate a second-level cache lookup of the second means for storing, the lookup hint information indicative of whether the second means for storing is predicted to store valid cached data associated with the lookup address; and
  when the second-level cache lookup is activated, perform the second-level cache lookup of the second means for storing based on the lookup address to determine whether the second means for storing stores valid cached data corresponding to the lookup address.

At least some examples provide a method for an apparatus comprising a first-level cache comprising a plurality of first-level cache entries for storing cached data, and a second-level cache comprising a plurality of second-level cache entries for storing cached data; the method comprising:
  performing a first-level cache lookup of the first-level cache based on a lookup address, to determine whether the first-level cache stores valid cached data corresponding to the lookup address;
  when lookup hint information associated with the lookup address is available, determining whether to activate or deactivate a second-level cache lookup based on the lookup hint information, the lookup hint information indicative of whether the second-level cache is predicted to store valid cached data associated with the lookup address; and
  when the second-level cache lookup is activated, performing the second-level cache lookup of the second-level cache based on the lookup address to determine whether the second-level cache stores valid cached data corresponding to the lookup address.

Further aspects, features and advantages of the present technique will be apparent from the following description of examples, which is to be read in conjunction with the accompanying drawings.

DESCRIPTION OF EXAMPLES

Figure 1:
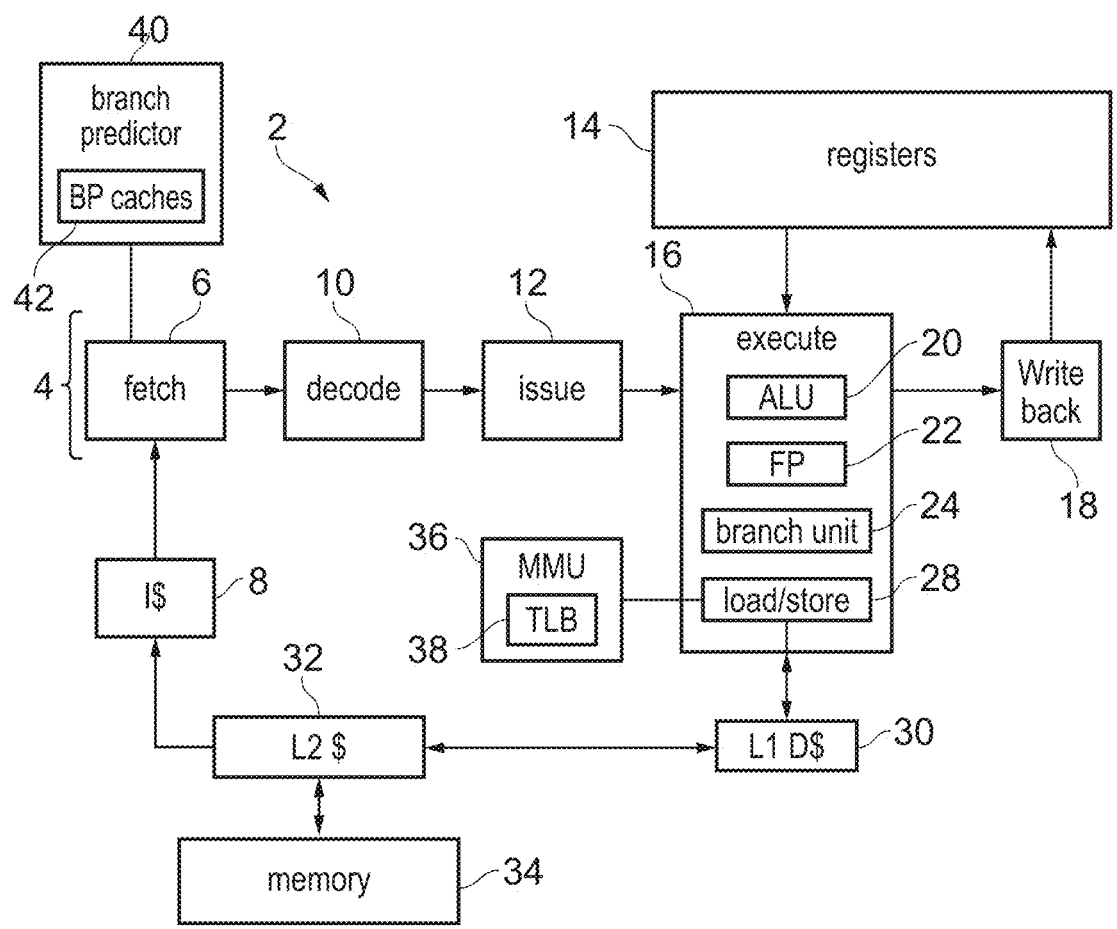
FIG. 1 schematically illustrates an example of a data processing system having a number of types of cache.

A processing system may have multiple levels of cache in a cache hierarchy. it may be desirable to provide increased cache capacity by increasing a number of cache entries in a given cache, but in general, the larger the cache, the slower the cache will be to access because the increased size means that signal paths for accessing the cache become longer and increase the latency of accessing the cache. In comparison to a single level of cache (which has equivalent cache capacity to the total capacity of the multiple levels of cache in the hierarchy), a multi-level cache hierarchy can provide a better balance between capacity and performance, as access to a first-level cache holding a smaller amount of data can be faster than would be possible for a single large cache, but when there is a miss in the first-level cache then the second-level cache provides additional storage capacity.

Hence, an apparatus may have a first-level cache having a number of first-level cache entries for storing cached data, and a second-level cache comprising a number of second-level cache entries for storing cached data. Cache control circuitry may be provided to perform lookups of the first-level and second-level cache. A first-level cache lookup may be performed based on a lookup address, to determine whether the first-level cache stores valid cached data corresponding to the lookup address. Similarly, the cache control circuitry may perform a second-level cache lookup of the second-level cache based on the lookup address to determine whether the second-level cache stores valid cached data corresponding to the lookup address.

In the techniques discussed below, the cache control circuitry is able to access lookup hint information associated with a given address, which can provide a prediction of whether the second-level cache is predicted to store valid cached data associated with that given address. Hence, when performing a first-level cache lookup for a given lookup address, the cache control circuitry can use any available lookup hint information associated with the lookup address to determine whether to activate or deactivate a second-level cache lookup of the second-level cache. This recognises that when the first-level cache lookup misses in the first-level cache this does not necessarily mean there will be a hit in the second-level cache. Performing the second-level cache lookup incurs a power cost which may be wasted in the case where the second-level cache lookup is performed but identifies a cache miss. By providing lookup hint information which can provide a prediction of whether the second-level cache is predicted to store valid cached data, this allows some precautionary second-level cache lookups to be eliminated so that it is less likely that power is wasted performing an unnecessary second-level cache lookup, and hence the overall power efficiency of the apparatus can be improved.

The lookup hint information may be implemented in different ways.

In one example the lookup hint information may comprise further cache hit prediction information which is indicative of whether, in a case when the first-level cache lookup identifies that the first-level cache stores valid cached data corresponding to the lookup address, the second-level cache is predicted to store further valid cached data corresponding to the lookup address. This approach may be considered surprising as in many cache hierarchies one would normally expect that if there has been a hit in the first-level cache then there is no need to look up the second-level cache as well. However, the inventors recognised that for some cache hierarchies, it may be possible to have multiple entries corresponding to the same address, one in the first-level cache and another in the second-level cache. For example, where the cache hierarchy includes a first-level branch target buffer and a second-level branch target buffer for providing entries predicting target addresses of branches, the hierarchy could be looked up based on a lookup address which identifies an instruction block and it is possible that there could be multiple branches in the same instruction block so that it may be desirable to allocate multiple entries for a particular instruction address. In that case, it is possible that even when the first-level cache lookup identifies a hit, the second-level cache lookup could also identify a hit. However, there may be many other cases where on a hit in the first-level cache, the second-level cache does not store any further valid cached data corresponding to the lookup address and so performing the second-level cache lookup may waste power. Therefore, by providing lookup hint information which acts as further cache hit prediction information indicating a prediction of whether the second-level cache is expected to provide a further hit in addition to the hit in the first-level cache for the same lookup address, this can allow more informed decisions on whether to activate the second-level cache lookup when a hit is identified in the first-level cache.

Hence, the cache control circuitry may perform the second-level cache lookup when the further cache hit prediction information indicates that the second-level cache is predicted to store the further valid cached data corresponding to the lookup address, even when the first-level cache lookup identifies that the first-level cache stores valid cached data corresponding to the lookup address. If the further cache hit prediction information is not available or indicates that the second-level cache is not predicted to store further valid cached data corresponding to the lookup address, then the second-level cache lookup may be deactivated. Hence, with this approach in implementations where it is possible that both the first and second levels of cache could include entries corresponding to the lookup address, the provision of the further cache hit prediction information acting as lookup hint information means it is not necessary to perform the second-level cache lookup for every lookup address, as instead some of the lookups of the second-level cache can be deactivated when the second-level cache is not predicted to provide further valid cached data, to save power.

The further cache hit prediction information could be stored in a separate structure from the first-level cache, which may be looked up based on the lookup address to identify whether there is any lookup hint information associated with a lookup address.

However, it may be more efficient to encode the further cache hit prediction information in a portion of the first-level cache entry which corresponds to the lookup address. Since the further cache hit prediction information is expected to be used in the case of a cache hit in the first-level cache, and in this scenario there will be a valid first-level cache entry in the first-level cache corresponding to the lookup address. By encoding the further cache hit prediction information in that first-level cache entry, this avoids the need to look up a separate structure, saving power. For example the further cache hit prediction information could be a flag or other indicator within the first-level cache entry corresponding to the lookup address, which specifies whether the second-level cache is predicted to store further valid cached data corresponding to the lookup address.

The further cache hit prediction information may be set by the cache control circuitry when allocating a further entry in the second-level cache corresponding to the same address that already has a valid entry cache in the first-level cache (e.g. on eviction of that further entry from the first-level cache to the second-level cache).

However, in some scenarios after such a further entry in the second-level cache has been allocated and the further cache hit information has been set to indicate that the second-level cache is predicted to store the further valid cached data, due to capacity conflict it is possible that the further entry in the second-level cache may be evicted. Hence, sometimes even when the second-level cache lookup is activated based on the further cache hit prediction information for the lookup address indicating that the second-level cache is predicted to store the further valid cached data corresponding to the lookup address, the second-level cache lookup may then identify that no valid cached data associated with the lookup address is actually stored in the second-level cache. In this case, the cache control circuitry may clear the further cache hit prediction information to indicate that the second-level cache is not predicted to store the further valid cached data corresponding to the lookup address. This means that in future if the same lookup address is provided in a later cycle then on that future lookup the second-level cache lookup may be deactivated as now there is no longer any valid entry in the second-level cache corresponding to the lookup address.

An alternative would be that on evicting a second-level cache entry from the second-level cache, the cache control circuitry could check whether the address associated with the looked up entry has any further cache hit prediction information available and if so clear the further cache hit prediction information to indicate that the second level cache no longer stores any valid cached data corresponding to the associated address. However, in implementations where the further cache hit prediction information is encoded in a portion of a first-level cache entry this may require an additional lookup of the first-level cache, which may be less preferred in cases of relatively high frequency of access to the cache hierarchy, and so introducing an additional first-level cache lookup may delay subsequent lookups for real requests for cached data. Therefore, in some cases it may be preferred not to update the further cache hit prediction information when information is evicted from the second-level cache. Instead, as described above the further cache hit prediction information can be updated in a case where that lookup hint information was used to trigger activation of the second-level cache lookup but the subsequently performed lookup then did not find any valid cached data in the second-level cache.

Another example of lookup hint information may be further cache miss prediction information which indicates whether, in a case when the first-level cache lookup identifies a cache miss (when the first-level cache does not store valid cached data corresponding to the lookup address), the second-level cache is also predicted to store no valid cached data corresponding to the lookup address. This can be helpful to allow second-level cache lookups to be suppressed in cases when there is a miss in the first-level cache. This is unusual as in most cache hierarchies one would usually expect the second-level cache to be looked up in cases where there is a miss in the first-level cache. However, some cache hierarchies may then experience a significant number of second-level cache misses which may waste power. Another approach can be that rather than activating the second-level cache lookup on every miss in the first-level cache, the cache control circuitry could monitor the number of consecutive hits or misses in the first-level cache and then decide whether to activate or deactivate the second-level cache lookup based on whether a certain number of consecutive hits or consecutive misses in the first-level cache have been detected. However, this approach can reduce performance because it can delay activating the second-level cache lookup in cases where the second-level cache lookup could be useful. Instead, by providing lookup hint information which acts as further cache miss prediction information indicating a prediction of whether, when a lookup for the lookup address misses in the first-level cache, the second-level cache is also predicted to store no valid cached data corresponding to the lookup address, this can allow a more informed decision of whether to perform the second-level cache lookup in the event of a miss in the first-level cache. This decision can be bespoke for the current lookup address (rather than depending on whether previous accesses hit or missed), so that it is less likely that lookups to the cache are suppressed in cases when a lookup would have found valid cached data corresponding to lookup address. However, by reducing the number of second-level cache lookups which are performed but identify a miss, power can be saved. Hence this provides a better balance of power and performance.

Hence, the cache control circuitry may deactivate the second-level cache lookup when the first-level cache lookup identifies a cache miss, the further cache miss prediction information is available for the lookup address and the further cache miss prediction information specifies that the second-level cache is predicted to store no valid cached data corresponding to lookup address.

In one example, when the further cache miss prediction information is available, the further cache miss prediction information may by default indicate a prediction that the second-level cache is predicted to store no valid cached data corresponding to the lookup address. With this approach it is not necessary to allocate any further cache miss prediction information for addresses for which the second-level cache does provide valid cached data corresponding to the lookup address, as in that case when the further cache miss prediction information is unavailable then it may be determined that the second-level cache lookup should be activated based on the miss in the first-level cache, so it is not necessary to indicate any explicit information about whether the second-level cache misses. By allocating the further cache miss prediction information only for those addresses for which both the first and second level caches miss this may in some embodiments reduce the number of addresses for which the further cache miss prediction information needs to be allocated to reduce the overall storage costs of the lookup hint information.

Alternatively, another approach could be that the further cache miss prediction information could instead by default represent predictions that the second-level cache is predicted to store valid cached data and in that case in the absence of any available further cache miss prediction information for a given lookup address, the cache control circuitry may assume that there is no need to activate the second-level cache lookup, instead activating the second-level cache lookup when the further case miss prediction information is available for an address for which the first-level cache lookup identifies the cache miss.

However, that approach may require more careful tracking of when information is evicted from the second-level cache, so it may be preferred to use the cache miss prediction information to indicate those addresses for which the second-level cache is predicted to store no valid cached data.

In the case where the further cache miss prediction information, when available, by default indicates a prediction that the second-level cache is predicted to store no valid cached data corresponding to the lookup address, then when new valid cached data for a given address is allocated to the first-level cache when the further cache miss prediction information for the given address is available, the cache control circuitry can clear the further cache miss prediction information associated with a given address to indicate that the further cache miss prediction information is no longer available. This will prevent the second-level cache lookup being suppressed on future lookups for the lookup address. In some implementations, it may also be possible for cache entries to be allocated directly into the second-level cache, and in this case then if new valid cached data for a given address is allocated to the second-level cache and the further cache miss prediction information for the given address is available, then the further cache miss prediction information can be cleared.

The further cache miss prediction information could be encoded in different ways. In one example there may be a separate structure from the first-level cache which may record the further cache miss prediction information for a certain subset of addresses. For example the further data structure could record addresses for which the further cache miss prediction is available. This further data structure could be looked up in parallel with the first-level cache to identify whether the lookup hint information is available.

However, in another approach the further cache miss prediction information for the lookup address may comprise a dummy first-level cache entry associated with the lookup address. The dummy first-level cache entry may be a valid first-level cache entry corresponding to the lookup address which does not provide valid cached data. The dummy first-level cache entry may be treated as not providing any valid cached data, but may be valid in the sense that there is meaningful information (other than cached data itself) stored in the dummy first-level cache entry associated with the lookup address. The dummy entry could be encoded in different ways. For example each first-level cache entry could include a flag or indicator which distinguishes a dummy entry from a real entry providing valid cached data. Another approach could be that the field of a first-level cache entry which would normally provide valid cached data could be set to a value which is not allowed to be provided for the cached data itself. For example, for a branch target buffer which provides an indication of a predicted branch target address, there may be a certain range of addresses which cannot act as valid branch targets, so if the target address field is set to one of these invalid values then the entry may be treated as a dummy first-level cache entry.

Regardless of how the dummy entry is encoded, by using a dummy entry in the first-level cache to represent the further cache miss prediction information, this avoids the need for a further lookup of a separate data structure based on the lookup address, which can save power and reduce the circuit area cost. In practice, although allocating dummy first-level cache entries to represent the further cache miss prediction information can reduce the number of first-level cache entries which are available for providing valid cached data, the scenarios when the further cache miss prediction information can be most useful may be those where the cache hierarchy is relatively sparsely populated with valid cached data so that using up a few first-level cache entries to represent the dummy entries may not significantly affect cache miss rates in the first-level cache.

When data has to be evicted from the first-level cache to make way for other data, the cache control circuitry may select a victim first-level cache entry from among a certain number of candidate first-level cache entries. The victim selection algorithm used to select the victim first-level cache entry may select the victim first-level cache entry according to an order of preference which, when the first candidate first-level cache entries include a dummy first-level cache entry, favours selection of the dummy first-level cache entry as the victim first-level cache entry in preference to a candidate first-level cache entry which provides valid cached data. This recognises that the dummy first-level cache entry is merely a hint that a second-level cache lookup could be suppressed to save power, and it may be preferable to retain a first-level cache entry which provides valid cached data in preference to the dummy first-level cache entry as the entry providing the valid cached data may have a greater effect on processing performance. Note that the order of preference used by the victim selection algorithm may also select invalid entries of the candidate first-level cache entries as the victim entry in preference to the dummy first-level cache entry. Hence, if it is possible to allocate data to an invalid entry there is no need to evict a dummy first-level cache entry, but if there are no invalid entries available then a dummy entry can be selected as the victim in preference to a valid entry providing valid cached data. If there are no invalid or dummy entries in the set of candidate first-level cache entries then the victim entry may be selected as one of the entries providing valid cached data. In this case the selection between the respective entries providing valid cached data could be based on replacement policy information, such as information indicating the least recently accessed entry among the candidate first-level cache entries.

In cases where there is no lookup hint information available for the lookup address then the cache control circuitry may determine whether the second-level cache lookup should be activated or deactivated based on whether the first-level cache lookup identifies a cache hit or miss. In the case of the cache hit, when the first-level cache lookup identifies that the first-level cache stores valid cached data corresponding to the lookup address, the cache control circuitry may determine that the second-level cache lookup should be deactivated. For a cache miss in the first-level cache lookup (when no valid cached data corresponding to the lookup address is stored in the first-level cache), when lookup hint information for the lookup address is not available, the cache control circuitry can determine that the second-level cache lookup should be activated.

While the examples below are discussed in the context of a first-level cache and a second-level cache, the overall cache hierarchy of which the first-level and second-level caches form a part may have more than two levels in some examples, and in this case the first-level cache and second-level cache could be any two levels of cache within the hierarchy (e.g. the "first-level" and "second-level" caches described below could be the level-1 and level-2 caches of a 3-level cache hierarchy, or could be the level-2 and level-3 caches of a 3-level cache hierarchy). Hence, the technique is not limited to only having two levels of cache, and the "first-level" and "second-level" caches do not need to correspond to level-1 and level-2 respectively—there could be at least one further level cache which is accessed in the cache hierarchy prior to the "first-level" cache.

As mentioned in the examples above, the lookup hint information could be obtained from different locations. In one example, the cache control circuitry may determine based on the first-level cache lookup whether the lookup hint information is available, and when the lookup hint information is available, obtain the lookup hint information associated with the lookup address from a first-level cache entry identified as corresponding to the lookup address in the first-level cache lookup. Hence, in this example the lookup hint information is stored in the first-level cache itself, for example as the dummy entry serving as further cache miss prediction information, and/or using an indicator associated with a first-level cache entry representing the further cache hit prediction information, as mentioned in the examples above.

Alternatively, other approaches can provide a lookup hint storage structure which is separate from the first-level cache, for storing the lookup hint information for a certain subset of addresses. In this case the cache control circuitry may perform a lookup hint lookup of the lookup hint storage structure based on the lookup address, to determine whether the lookup hint information is available for the lookup address.

The first-level cache and second-level cache may act as predictive storage structures to cache prediction information used to determine predicted behaviour associated with the lookup address. For example, the predicted behaviour could be used to control speculative operations by a processor. A recovery mechanism may be provided to trigger a recovery action when a misprediction is identified. The prediction information stored in the first-level and second-level caches could be updated based on actual behaviour detected from executed instructions. For example, the first-level and second-level set-associative caches may provide branch prediction information used by branch prediction circuitry to determine predicted branch instruction behaviour. The techniques discussed above could also be used for multi-level cache hierarchies used as other types of prediction storage structure, not related to branch prediction, such as an address prediction structure for predicting patterns of addresses of instructions to be executed or data accesses to be made to memory, which could be used to initiate early requests to obtain data or instructions from memory or a cache. It will be appreciated that other aspects of processing apparatus behaviour could also be predicted using a predictive storage structure. For any of such types of cache, when implemented using a multi-level cache hierarchy with first and second levels of cache, the lookup hint information described above may be provided to help save power by suppressing unnecessary cache lookups in the second-level cache.

However, the technique is particularly useful for branch prediction circuitry, because often the performance requirements for branch prediction circuitry may be greater than for data caches or other types of cache where slower performance may be tolerated. For branch predictors in particular, the branch predictor is a very busy component of a data processing system because it may be looked up on every cycle to identify possible branch prediction information for determining the next fetch address to be looked up in the following cycle. In contrast other types of cache may be accessed less frequently. Hence, the techniques discussed above using lookup hint information can be particularly beneficial for branch prediction caches. As the branch prediction caches may be accessed relatively frequently there can be a greater power saving in being able to deactivate second-level cache lookups based on the lookup hint information, compared to other types of cache.

In particular, the branch prediction circuitry may have a branch target buffer (BTB) which caches branch target buffer information which indicates properties of taken branch instructions predicted to occur within a block of instructions associated with a given address. The BTB may be implemented as a multi-level cache hierarchy, and so the first-level and second-level caches mentioned earlier may be first-level and second-level BTBs. Branch prediction circuitry may determine a predicted target address for a first taken branch instruction predicted to occur within a block of one or more instructions associated with lookup address based on branch target buffer information cached in a cache entry of the first-level or second-level set-associative cache associated with lookup address. In such a branch target buffer, performance demands are extremely high compared to other types of caches because the prediction information provided by the branch target buffer is used to form a prediction of a branch target address which may then be used as the lookup address for a subsequent cycle, and so the high frequency of access to the branch target buffer may mean that there are significant power savings available by using the lookup hint information to suppress certain second-level cache lookups. This is particularly useful for a BTB (as opposed to other types of branch prediction cache) because BTBs may particularly benefit from a multi-level cache hierarchy as it can be desirable to reduce the size of the level one BTB to speed up the prediction of the next branch target address based on the lookup address.

Nevertheless, the techniques could also be used for other types of caches, including data caches, instruction caches or other forms of prediction cache other than branch prediction caches. For any set of caches comprising a first-level cache and a second-level cache it is possible to use the lookup hint information to determine whether to activate or deactivate the second-level cache lookup.

The technique can be particularly useful for a form of prediction cache for which the prediction circuitry may determine the predicted behaviour based on a default prediction in cases when the first-level cache lookup determines that no valid cached data corresponding to the lookup address is stored in the first-level cache and the second-level cache for the lookup address is either deactivated or is activated but determines that no valid cached data corresponding to the lookup address is stored in the second-level cache. In cases where a default prediction is made when no hit in either the first or second level cache is identified then this means that it may not be a problem that the second-level cache lookup is deactivated even if there was some valid cached data stored in the second-level cache, as the default prediction can still be made. While making the default prediction instead of the prediction based on the valid cached data in the second-level cache could potentially result in a misprediction, this would merely cause a performance reduction rather than any incorrect processing result, and a recovery mechanism may be provided to recover from that misprediction, so it is not essential for there to be 100% percent accuracy in the maintenance of lookup hint information indicating whether or not the second-level cache is predicted to contain valid cached data for the lookup address. It may be acceptable for the lookup hint information sometimes to be incorrect. In types of cache where a default prediction is made when there is a miss in both levels of cache then it may be relatively common that there may be some addresses for which both lookups would miss, and so in such scenarios it can be particularly useful to support the use of the lookup hint information to allow the second-level cache lookup to be suppressed.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system include a L1 data cache 30, the L1 instruction cache 8, a shared L2 cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The apparatus 2 also has a branch predictor 40 which may include one or more branch prediction caches 42 for caching prediction information used to form predictions of branch behaviour of branch instructions to be executed by the branch unit 24. The predictions provided by the branch predictor 40 may be used by the fetch stage 6 to determine the sequence of addresses from which instructions are to be fetched from the instruction cache 8 or memory system. The branch prediction caches may include a number of different forms of cache structure, including a branch target buffer (BTB) which may cache entries specifying predictions of whether certain blocks of addresses are predicted to include any branches, and if so, the instruction address offsets (relative to the start address of the block) and predicted target addresses of those branches. Also the branch prediction caches 42 could include branch direction prediction caches which cache information for predicting, if a given block of instruction addresses is predicted to include at least one branch, whether the at least one branch is predicted to be taken or not taken.

Hence, the data processing system may include a number of cache structures, including for example the data cache 30, instruction cache 8, L2 cache 32, TLB 38 and/or branch prediction caches 42. It will be appreciated that other types of cache structure could also be provided. For example, other types of prediction caches could include a data prefetcher cache which caches information for predicting data addresses for future load/store instructions to be processed by the load/store unit 28, or an instruction prefetcher cache which caches information for predicting which instructions may need to be fetched into the instruction cache 8 prior to those addresses actually being requested by the fetch stage 6.

Figure 2:
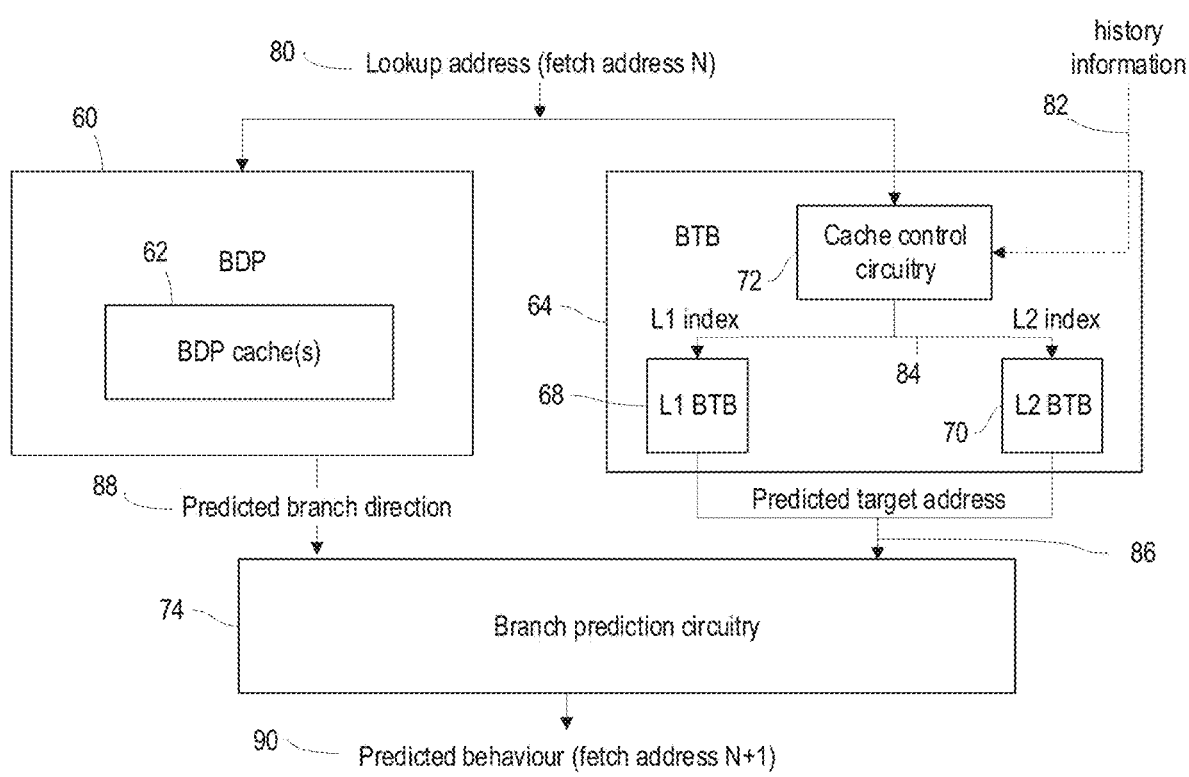
FIG. 2 shows an example of a branch predictor having a number of branch prediction caches, including a level one branch target buffer (BTB) and a level two BTB.

FIG. 2 shows in more detail components of the branch predictor 40 which comprises a branch direction predictor (BDP) 60 and branch target buffer (BTB) 64. The BDP 60 is for predicting whether the branch direction is taken or not taken for a branch within a block of instructions represented by a lookup address 80. The BDP 60 could use any branch direction prediction technique, such as bimodal prediction, TAGE, perceptron, etc. The BDP 60 has a number of branch direction prediction caches 62 for caching branch prediction state used to determine the predicted branch direction 88 for one or more respective branches within the block of addresses represented by the lookup address 80.

The branch target buffer 64 provides a prediction of various branch properties associated with one or more branches within a block of instructions associated with the lookup address 80. The BTB 64 has indexing circuitry 66 for generating one or more index values 84 for indexing into a level 1 (L1) BTB 68 and a level 2 (L2) BTB 70. The L1 and L2 BTBs 68, 70 are examples of the first-level and second-level caches described earlier. Cache access circuitry 72 is provided for controlling lookups to the L1 BTB 68 and L2 BTB 70 based on the index values 84, to determine whether there is any valid branch information held in the BTBs 68, 70 for the lookup address. The branch information may indicating various branch properties to be predicted, including at least the predicted target address 86 of a first taken branch predicted to be present within the block of instructions associated with the lookup address. Other information that could be predicted based on cached information in the BTBs 68, 70 could include branch type, or branch offset (offset of the instruction address of the branch relative to the lookup address). Based on the predicted branch direction 88 and predicted target address 86 provided by the BDP 60 and the BTB 64 respectively, branch prediction circuitry 74 determines a predicted behaviour 90 associated with the lookup address 80, where for the branch predictor 40 the predicted behaviour 90 is a fetch address to be used in a subsequent cycle N+1 after the cycle N in which the fetch address used as the lookup address 80 is provided. That is, the predicted address output as the fetch address for cycle N+1 may become the lookup address in the following cycle. Instructions may be fetched from a sequence of fetch addresses determined based on the predictions made by the branch predictor. Information in the BDP caches 62 and L1 and L2 BTBs 68, 70 is updated based on actual results of executed branches determined by the branch unit 24 in the execute stage 16.

Providing a multi-level cache hierarchy for the BTB 64 can be useful to provide a balance between performance, power and circuit area. In general, in a multi-level cache hierarchy one would expect that a L2 cache 70 should be looked up only when a miss is detected in the L1 cache 68. However, in practice missing in the L1 cache 68 does not necessarily imply that there will be information in the L2 cache 70. Also, there may be some scenarios in which it is desirable to lookup the L2 cache 70 even when there is a hit in the L1 cache 68, for example if the BTB 64 supports multiple branches being predicted within the same block of instructions identified by the lookup address 80, in which case both the L1 and L2 BTB 68, 70 could include entries for the same address. One approach could be to look up the L2 BTB 70 regardless of whether there is a hit or miss in the L1 BTB 68, but this may consume a lot of additional power unnecessarily as in the case of a hit in the L1 BTB 68 it may be relatively rare that there is also an entry in the L2 BTB 70, while in the case of a miss in the L1 BTB 68 there may be relatively frequent cases when there is also a miss in the L2 BTB 70.

Figure 3:
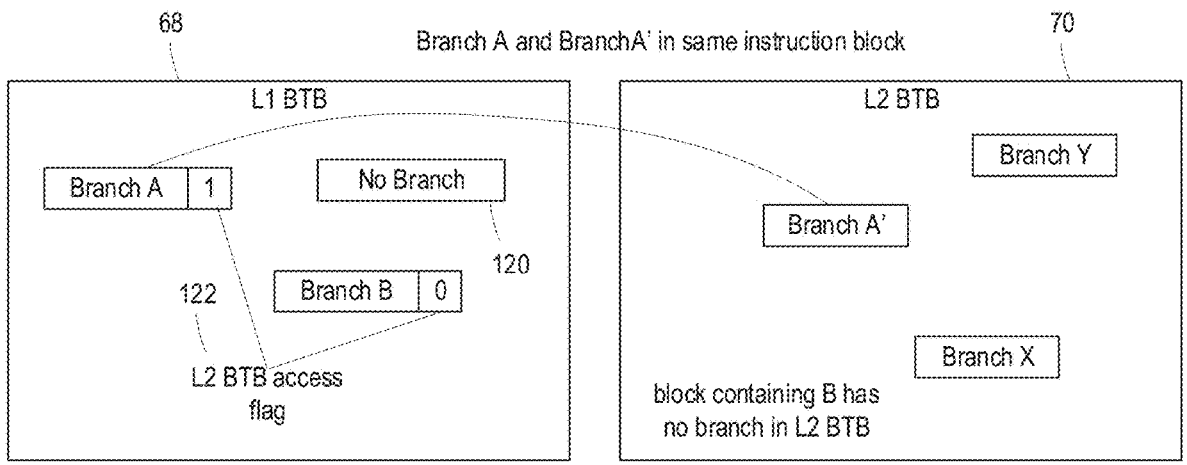
FIG. 3 schematically illustrates use of lookup hint information to control whether to activate or deactivate a lookup of a second-level cache.

To improve the power efficiency of the BTB, FIG. 3 shows examples of maintaining lookup hint information which can be used by the cache control circuitry 72 to determine whether to activate or deactivate a L2 BTB lookup of the L2 BTB 70. When the cache control circuitry 72 receives a lookup address 80, as well as initiating the L1 BTB lookup, the cache control circuitry 72 can determine whether there is any lookup hint information available associated with the lookup address 80, and if available the lookup hint information can be used to determine whether the L2 lookup in the L2 BTB 70 should be performed.

FIG. 3 shows two different examples of types of lookup hint information: a "no branch in L2 BTB" marker 120 and an "L2 BTB access" flag 122.

The no branch in L2 BTB marker 120 is an example of further cache miss prediction information, which indicates a prediction that, for an address which misses in the L1 BTB 68, the address is also predicted to miss in the L2 BTB 70 and so the cache control circuitry 72 can deactivate the L2 cache lookup to save power. The no branch in L2 BTB marker 120 could be set when an L2 lookup is performed in the L2 BTB 70 for a given address and the lookup identifies a cache miss. The cache control circuitry may then set the no branch in L2 BTB marker 120 to indicate that for future lookups to the same address, there is no need to activate the L2 lookup. In other implementations, there may be a more complicated heuristic for controlling setting of the no branch in L2 BTB marker 120, for example some approaches may require counting of more than one L2 BTB miss for a given address before the no branch in L2 BTB marker 120 is set. The no branch in L2 BTB marker 120 can be cleared in cases when a new branch for the corresponding address is injected into the L1 BTB, as the no branch in L2 BTB marker 120 becomes unnecessary (since the default approach when there is no lookup hint information available for a given address may be that on a hit in the L1 BTB 68 the L2 BTB lookup should be suppressed).

In the example shown in FIG. 3 the no branch in L2 BTB marker 120 is implemented using a dummy L1 BTB entry allocated into the L1 BTB 68 corresponding to a given address. This means that the no branch in L2 BTB marker 120 can be allocated only for addresses which would miss in the L1 BTB 68 since if the address hit in the L1 BTB then there would be a valid entry providing real branch information corresponding to the address. The dummy entry 120 may be marked as valid, but has an encoding which distinguishes it from a real branch entry providing real branch information, for example by providing a flag in the L1 BTB entry which indicates whether the entry is a dummy entry or a real entry, or by encoding another field of the L1 BTB entry with a value that signifies that the entry represents a dummy entry. For example, the field of the L1 BTB entry 68 which identifies the predicted target address for a branch could be set to an address in an invalid range which is not allowed to be used for real instruction addresses, to signify that the entry represents a dummy entry indicating the no branch in L2 BTB marker 120.

In implementations where the no branch in L2 BTB marker 120 is represented as a dummy entry in the L1 BTB 68, then the dummy entry 120 may be preferred for selection as a victim entry to be evicted to the L2 BTB, in preference to real entries providing real branch information, when it is necessary to evict data from the L1 BTB 68 to the L2 BTB 70 to make way for other branch information. Also, in implementations where the L1 BTB is a set-associative cache, in cases where an L2 lookup is performed in the L2 BTB 70 and it is identified that there is a miss in the L2 BTB 70 and so a no branch in L2 BTB marker 120 could be allocated to the L2 BTB 68, then if all the set of L1 BTB entries which are allowed to be allocated for entries corresponding to the address of the instruction block which missed in the L2 BTB are already used to represent real branch information, then the cache control circuitry may determine not to allocate a no branch in L2 BTB marker 120 for the address which missed in the L2 BTB, as it may be preferred to retain the real branch information rather than evicting real branch information to make way for the no branch in L2 BTB marker 120.

Hence, the dummy entry 120 representing the no branch in L2 BTB marker acts as further cache miss prediction information which, in the event of a miss in the L1 BTB 68 indicates that the L2 BTB is also predicted to miss for the lookup address, and so when this is detected then the L2 BTB lookup can be suppressed. While allocating a dummy entry to represent the no branch in L2 BTB marker 120 means that there is some loss of L1 BTB capacity, this is typically acceptable since the no branch in L2 BTB markers will be more common in cases where code is executing which has low branch density which means that there are less stringent performance requirements for the L1 BTB 68. While FIG. 3 shows an example where the no branch in L2 BTB marker 120 is encoded using a dummy entry in the L1 BTB 68, another approach is to use a dedicated filter structure as discussed further with respect to FIG. 7 below.

FIG. 3 shows a second example of lookup hint information, which is the L2 BTB access flag 122. This is an example of further cache hit prediction information which indicates, for an entry of the L1 BTB 68 detected as a hit for a given lookup address, whether a further hit is predicted to occur if the lookup address is looked up in the L2 BTB 70 as well. The situation where the same address hits in both L1 and L2 BTB 68, 70 can arise because there may be multiple branches identified within the same block of instructions and while initially those branches may have been allocated into the L1 BTB, eventually because of capacity conflicts one of those branches may have its entry evicted out to the L2 BTB 70. Normally one would expect the L2 BTB should not be looked up in cases where the address hits in the L1 BTB 68, but if it is possible for there to be multiple branches with entries in both BTBs (such as in the case where branch A shown in the L1 BTB in FIG. 3 also has a second branch A' indicated in the L2 BTB for the same instruction block address) then one might think this would require the L2 BTB to be looked up every time regardless of whether the L1 BTB lookup hits or misses. However this would waste a significant amount of power. To improve power efficiency, the cache control circuitry 72 can set the L2 BTB access flag 122 corresponding to a given L1 BTB entry to indicate whether a further hit is predicted to arise in the L2 BTB.

In the example of FIG. 3 the L2 BTB access flag 122 is set to 1 for the entry for branch A for which there is a corresponding branch for the same lookup address in the L2

BTB, while the L2 BTB access flag 122 is set to 0 for branch B which does not have a corresponding branch associated with the same instruction block in the L2 BTB 70. Of course, the L2 BTB access flag 122 could be encoded in a different way instead (e.g. with 0 indicating that a further branch is predicted to be present in the L2 BTB and 1 indicating that no further branch is predicted to be present in the L2 BTB). Also, it would be possible for the L2 BTB access flag 122 to be recorded in a separate filter structure rather than being directly associated with L1 BTB entries. However, it can be more efficient to provide these in the corresponding L1 BTB entry itself, so that a single lookup of the L1 BTB is sufficient to identify both the branch information for the first branch A in the looked up instruction block and also identify whether the further cache hit prediction information. The L2 BTB access flag 122 can be set by the cache control circuitry based on monitoring of allocations into the cache or evictions from the L1 BTB 68 into the L2 BTB 70. For example, when evicting a given L1 BTB entry 68 to the L2 BTB 70, the cache control circuitry may check whether any other L1 BTB entries (in the same set of locations indexed by the L1 index derived from the corresponding address) records a branch for the same instruction block address and if so may set the L2 BTB access flag 122 to indicate that there is predicted to be a further branch for the same address in the L2 BTB 70.

It is possible that subsequently the second branch A' (which is stored in the L2 BTB 70 for the same instruction block has the branch A in L1 BTB 68) could itself be evicted from the L2 BTB and so the L2 BTB access flag 122 associated with branch A may become out of date. It is not essential to maintain the L2 BTB access flag 122 precisely and it is acceptable for the L2 BTB access flag 122 to sometimes indicate the wrong result (since the penalty of not updating the L2 BTB access flag 122 would only be a decrease in power efficiency by performing an unnecessary L2 BTB lookup, but would not affect the correctness of processing results). Therefore, one approach for maintaining the L2 BTB access flag 122 is to update the flag to clear it to 0 (or to another value used to represent the case where there is no further branch in the L2 BTB 70 for a branch cached in the L1 BTB 68) in cases where the L2 BTB lookup is activated but identifies a cache miss in the L2 BTB 70. This way, there is no need to introduce an extra L1 BTB lookup merely for the purpose of maintaining the flag 122, which could be a challenge as the L1 BTB may be being looked up already for real branch predictions virtually every cycle, so there is not much spare capacity to include additional lookups for maintaining the lookup hint information.

Hence, in summary, FIG. 3 shows how if a given block of instructions (e.g. 32 byte block) has no branch in both L1 and L2, a no branch marker 120 is created in L1 BTB to indicate not to activate L2 BTB. If the 32B block contains the branch only in the L1 BTB, the branch will be marked as L2 BTB access flag=0. If a 32B block has a branch in both L1 and L2, the branch in the L1 BTB will be marked as L2 BTB access flag=1. When the L1 BTB lookup hits in branch A, the pipeline will activate the L2 BTB lookup. But, when the L1 BTB lookup hits in branch B, the L2 BTB lookup will be suppressed.

Figure 4:
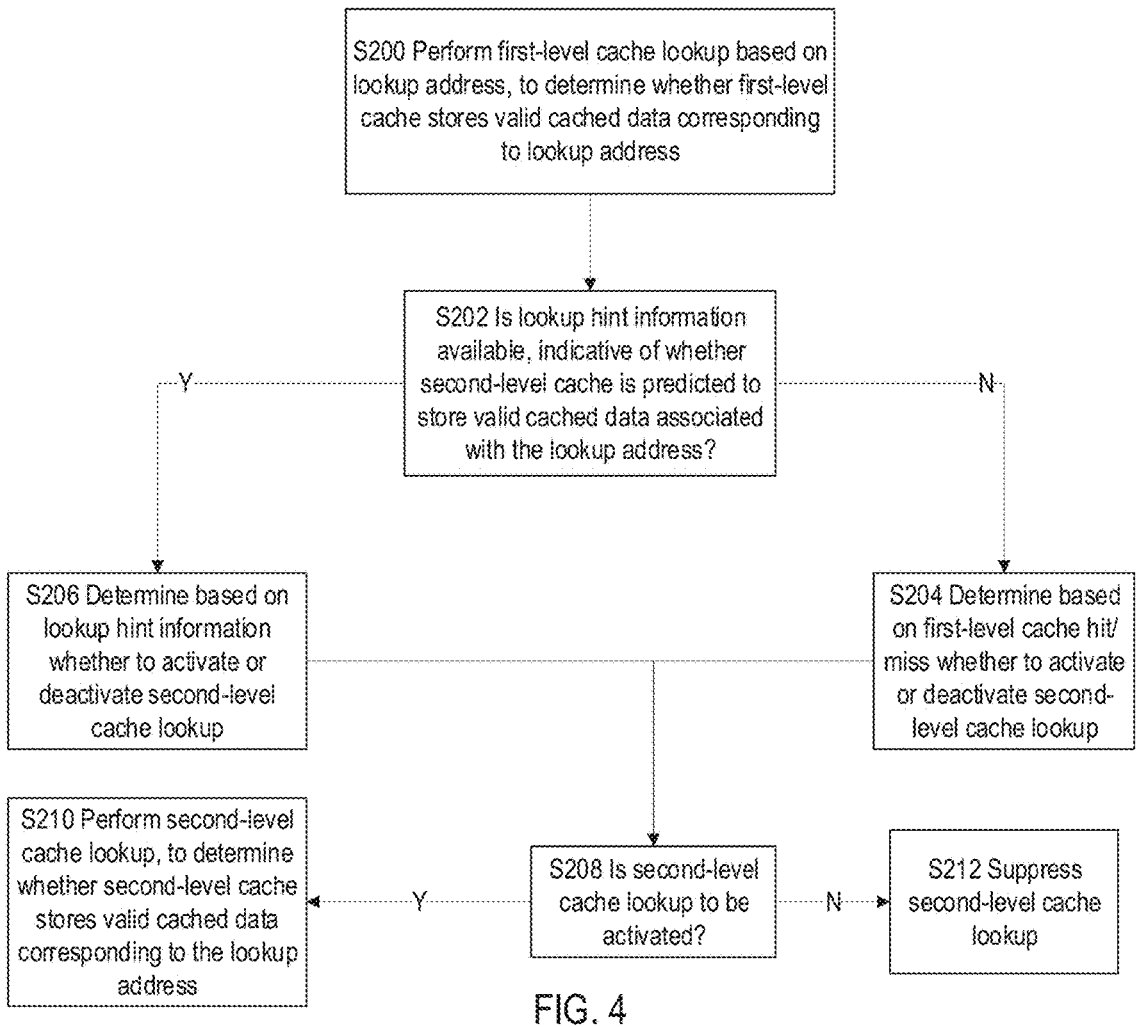
FIG. 4 is a flow diagram showing a method of using lookup hint information to determine whether to activate or deactivate a second-level cache lookup.

In one example, the cache control circuitry 72 may determine whether to activate the L2 BTB lookup based on the following sequence:
 if ('branch in L2 BTB'==1)
  activate L2 BTB
 else if ('no branch in L2 BTB'==1)
  do not activate L2 BTB
 else if ('no hit in L1 BTB')
  activate L2 BTB
 else // branch hit in L1 BTB
  do not activate L2 BTB FIG. 4 is a flow diagram showing a method of controlling cache lookups in an L1 cache and an L2 cache, which could be the L1 and L2 BTBs as described above, but which could also be other types of cache structure as the lookup hint information described above could also be used for caches other than BTBs.

At step S200 the cache control circuitry performs a first-level (L1) cache lookup based on the lookup address 80, to determine whether the L1 cache 68 stores valid cached data corresponding to the lookup address.

At step S202 the cache control circuitry determines whether lookup hint information is available for the lookup address, indicating whether the L2 (second-level) cache is predicted to store valid cached data associated with the lookup address. If the lookup hint information is not available then at step S204 the cache control circuitry 72 determines whether to activate or deactivate the L2 cache lookup based on whether the L1 cache lookup identified a hit or a miss. In the case of a hit (when the L1 cache does store valid cached data corresponding to the lookup address) the L2 cache lookup can be deactivated, while if there is a miss (when the L1 cache lookup identifies that there is no valid cached data in the L1 cache 68 corresponding to the lookup address) then the L1 cache lookup can be activated.

On the other hand, if at step S202 lookup hint information is determined to be available for the lookup address then at step S206 the cache control circuitry 72 determines whether to activate or deactivate the L2 cache lookup based on the lookup hint information 120, 122. It will be appreciated that while FIG. 3 shows an example with two different types of lookup hint information, this is not essential and other examples could support only one of the no branch in L2 BTB marker 120 and L2 BTB access flag 122. In the case of the no branch in L2 BTB marker 120, then if this is determined to be available then at step 206 the cache control circuitry may determine that the L2 cache lookup should be deactivated. For the L2 BTB access flag 122, the value of the flag may specify whether the L2 cache lookup should be activated or deactivated.

Regardless of whether the activation or deactivation of the L2 cache lookup is determined at step S204 based on the cache hit/miss in the L1 cache, or based on the lookup hint information at step S206, at step S208 the cache control circuitry determines whether the L2 cache lookup is to be activated and if so at step S210 performs the L2 cache lookup, to determine whether the L2 cache 70 stores valid cached data corresponding to the lookup address. If it is determined that the L2 cache lookup is to be deactivated then at step S212 the L2 cache lookup is suppressed to save power.

Figure 5:
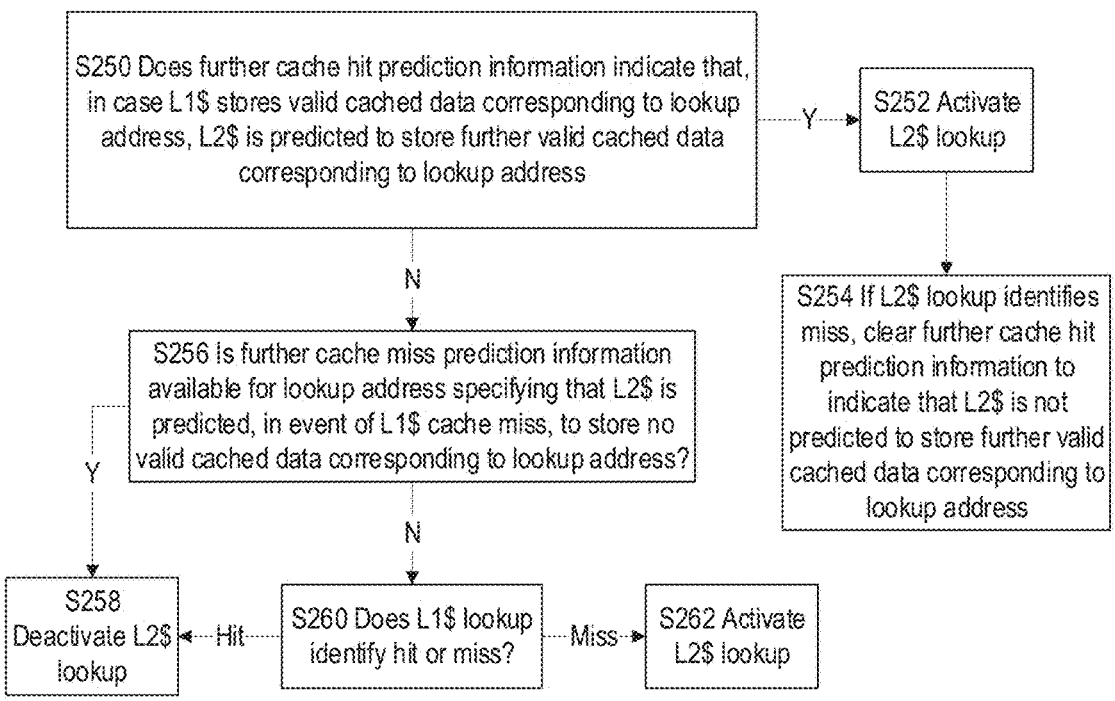
FIG. 5 shows in more detail an example of determining whether to activate or deactivate the second-level cache lookup.

FIG. 5 is a flow diagram showing in more detail the decisions at steps S202, 204 and 206 of FIG. 4, in an implementation which supports both the further cache hit prediction information 122 (e.g. the L2 BTB access flag) and the further cache miss prediction information 120 (e.g. the no branch in L1 BTB marker).

At step S250 the cache control circuitry determines whether further cache hit prediction information corresponding to the lookup address indicates that, in the case where the L1 cache 68 stores valid cached data corresponding to the lookup address, the L2 cache 70 is predicted to store further valid cached data corresponding to the lookup address. For example, with the encoding shown in FIG. 3 step 250 may comprise checking whether the L1 cache lookup at step S200 identified a hit and if so whether the L2 BTB access flag 122 is set to 1. If the further cache hit prediction information indicates that the L2 cache is predicted to store further valid cached data corresponding to the lookup address, then at step S252 the L2 cache lookup is determined to be activated, even though the L1 lookup hit in the L1 cache 68. At step S254, after performing the L2 cache lookup it is determined whether the lookup address hit or missed in the L2 cache 70 and if a miss is identified, then the cache control circuitry 72 updates the further cache hit prediction information 122 associated with the lookup address to clear it so that it now indicates that the L2 cache is not predicted to store further valid cached data corresponding to the lookup address (e.g. the L2 BTB access flag 122 corresponding to the lookup address is cleared to 0). This ensures that on further lookups to the same address the L2 cache lookup would no longer be activated on a hit in the L1 cache 68, to save power, as the fact that the L2 cache lookup identified a miss at step S254 would indicate that the previous entry allocated in the L2 cache for the lookup address has been evicted.

If the further cache hit prediction information is not available or indicates that the L2 cache is predicted not to store further valid cached data corresponding to the lookup address then at step 256 the cache control circuitry 72 determines whether further cache miss prediction information is available for the lookup address. The further cache miss prediction information specifies that the L2 cache is predicted, in the event of a L1 cache miss, to store no valid cached data corresponding to the lookup address. If the further cache miss prediction information is available and specifies that the L2 cache is predicted not to store valid cached data corresponding to the lookup address, then at step S258 the L2 cache lookup is determined to be deactivated to save power.

On the other hand, if at step 256 the further cache miss prediction information is not available then at step 260 the cache control circuitry 72 determines whether to deactivate or activate the L2 cache lookup depending on whether the L1 cache lookup identifies a hit or miss as described earlier. In the event of an L1 cache lookup hit then the method proceeds to step S258 to deactivate the L2 cache lookup while if the L1 cache lookup identifies a miss then at step S262 the L2 cache lookup is activated.

Figure 6:
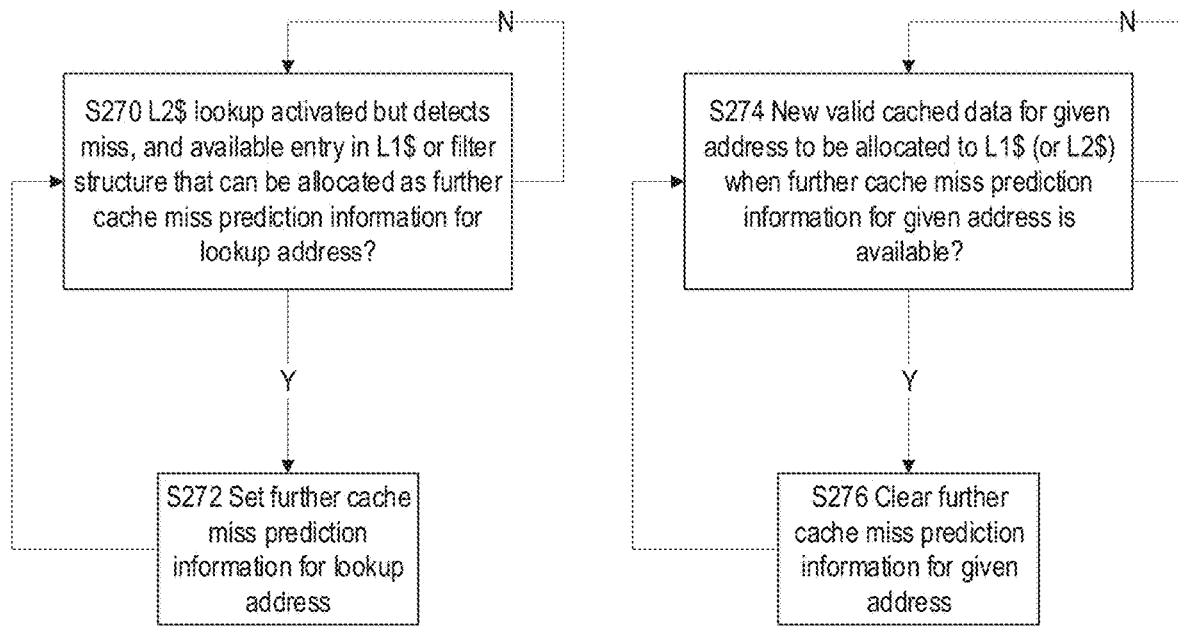
FIG. 6 is a flow diagram illustrating clearing of further cache miss prediction information when new valid cached data is to be allocated to the first-level cache or second-level cache.

FIG. 6 shows a flow diagram for illustrating a method of maintaining the further cache miss prediction information 120. At step S270 the cache control circuitry 72 detects whether, on an occasion when the L2 cache lookup is activated, the L2 cache lookup detects a miss and there is an available entry in the L1 cache 68 or a separate filter structure that can be allocated as further cache miss prediction information associated with the lookup address. If on activation of the L2 cache lookup a miss is detected and there is an available entry for allocation as the further cache miss prediction information for the lookup address, then at step S272 the further cache miss prediction information is set for the lookup address to indicate that on future lookups to the same address the L2 cache lookup does not need to be activated. The method then returns to step S270 to continue checking for whether the criteria checked at step S270 are met for other lookup addresses.

On the other hand if at step S270 no L2 cache lookup is activated or a hit has been detected in the L2 cache lookup and there is no need to set the further cache miss prediction information. Similarly even when a miss is detected in an L2 cache lookup but there is no available entry that can be allocated as further cache miss prediction information, then no further cache miss prediction information is set and so the cache control circuitry continues to check whether the condition detected as step S270 is satisfied.

Meanwhile, in parallel with the checks shown in steps S270 and S272, at step S274 the cache control circuitry monitors allocations into the caches 68, 70. In some implementations any new allocations of entries into the caches may always be performed in the L1 cache 68 and entries may only be allocated to the L2 cache 70 due to evictions from the L1 cache 68, so in that case it is not necessary to monitor the L2 cache 70 for allocations, but in other implementations it may be possible to allocate new entries directly into the L2 cache and in that case the cache control circuitry may monitor allocations in both caches. At step S274 the cache control circuitry determines whether there is any new valid cached data for a given address to be allocated to the L1 cache 68 (or if monitored, the L2 cache 70), when further cache miss prediction information associated with that given address is available in the L1 cache or the filter structure. If not then no action is necessary regarding maintenance of further cache miss prediction information. However, if on an allocation into the L1 cache or L2 cache there is further cache miss prediction information associated with the given address that is available, then at step S276 the further cache miss prediction information is cleared for the lookup address, so that the further cache miss prediction information is indicated as no longer available, or set to a value indicating that a miss in the L2 cache is not predicted to arise for the given address. This recognises that once data is allocated into the L1 cache then the default approach shown at steps S260 and S258 of FIG. 5 will mean that it is not necessary to make cache miss prediction information available in order to cause the L2 cache lookup to be deactivated since the presence of the valid cached data now allocated in the L1 cache will prevent the L2 cache lookup proceeding. By clearing the further cache miss prediction information this may free up space in the L1 cache or filter structure for other entries. The method then returns back to step S274 to continue checking for this condition.

Figure 7:
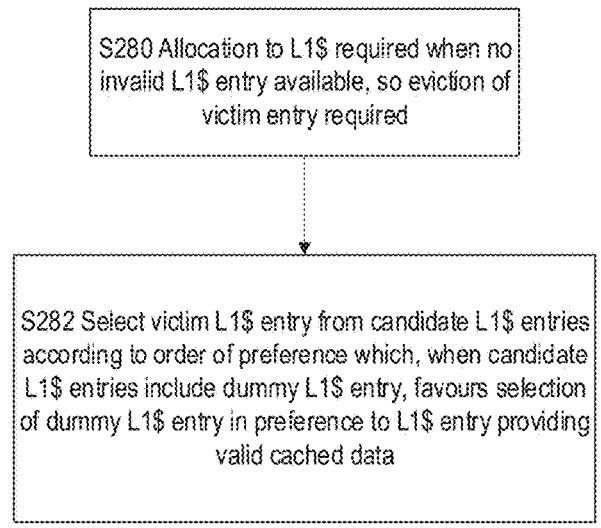
FIG. 7 is a flow diagram illustrating selection of a victim level one cache entry.

FIG. 7 shows a method of controlling victim selection for an implementation where the further cache miss prediction information is encoded as a dummy entry 120 in the L1 cache 68 as in the example of FIG. 3. In this case at step S280, on an occasion where it is determined that allocation of a new entry to the L1 cache is required when there is no invalid L1 cache entry available that can be allocated for the corresponding address, and so eviction of a victim entry is required, then the cache control circuitry proceeds to step S282 to select which L1 cache entry should be selected as the victim entry. There may be a number of candidate L1 cache entries which may be available for selection. For example if the L1 cache is implemented as a set-associative cache then the candidate L1 cache entries may be the entries in the set indexed based on the index value 84 derived from the lookup address. The victim L1 cache entry is selected according to an order of preference which, when the candidate L1 cache entries include a dummy L1 cache entry 120 representing the cache miss prediction information, favours selection of the dummy L1 cache entry in preference to an L1 cache entry that provides valid cached data. This will tend to preserve the real information stored in the L1 cache and will favour eviction of the lookup hint information. Whether the candidate entries are dummy entries or real entries may not be the only criteria at step S282.

The order of preference for victim selection may further may further rank invalid entries ahead of dummy entries so that when there is an invalid L1 cache entry available then that entry can be selected for allocating the new data rather than evicting a dummy L1 cache entry. Also in cases where there are no dummy L1 cache entries then the selection between the candidate L1 cache entries may depend on replacement policy information which can be maintained associated with the respective entries to track which entries should preferentially be selected as the victim. For example the replacement policy information could be least recently used (LRU) information which is updated to track how recently different entries have been accessed so that the least recently used entry could be preferentially selected. Other approaches may use replacement policy information which is less precise but which may tend to favour selection of less recently used entries in preference to more recently used entries. Any type of replacement policy information could be used. However, in general by selecting dummy entries in preference to real entries, this can maintain branch prediction performance or other performance associated with use of the cache.

Figure 8:
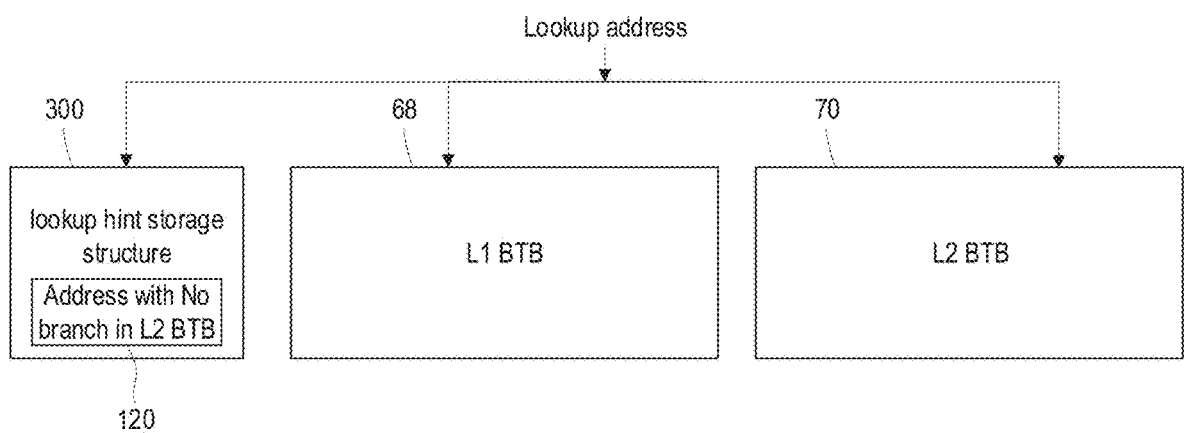
FIG. 8 shows an alternative example in which lookup hint information is stored in a lookup hint storage structure separate from the first-level cache.

The example shown in FIG. 3 records the lookup hint information 120, 122 in the L1 BTB 68 itself, which can be beneficial for power reasons as it means a single lookup based on the lookup address can be enough to identify the cached information in the L1 BTB and any associated lookup hint information. However, as shown in FIG. 8 another approach can be to provide a separate lookup hint storage structure 300 which can be looked up based on the lookup address, in parallel with the L1 BTB lookup 68, and which provides entries which record the available lookup information for a certain subset of addresses. For example, rather than allocating dummy entries in the L1 BTB 68, the no branch in L2 BTB marker 120 can be represented by storing the addresses of blocks of instructions which do not have a branch in the L2 BTB 70 within the lookup hint storage structure 300. Hence, if the lookup address hits in the lookup hint storage structure 300, then in the event of either a hit or a miss of the L1 BTB 68 there is no need to deactivate the L2 BTB lookup. Similarly, in some examples the further cache hit prediction information could be recorded in the lookup hint storage structure 300 instead of the L1 BTB 68.

While the examples described above are described in the context of an L1 BTB 68 and an L2 BTB, the same techniques of providing lookup hint information 120, 122 could also be used for other types of prediction cache or for caches which do not provide any prediction at all (such as the L1 and L2 data caches 30, 32). While the examples above show a hierarchy with only two cache levels, it is also possible to apply the technique to any two levels among a hierarchy with three or more levels. For example the lookup hint information could encode whether lookups are necessary in more than one further level of cache. Also, while FIG. 3 shows that the very first level of cache looked up in the cache hierarchy is associated with the lookup hint information (i.e. the cache in the hierarchy that can return cached data with the shortest latency), in other examples with three or more caches in the hierarchy it may be that the lookup hint information is associated with entries in the L2 cache and controls whether lookups to an L3 cache or further cache are needed, so it is not essential to associate the lookup hint information with the entries in the very first cache looked up. The first-level cache and second-level cache mentioned earlier may be any two caches within a cache hierarchy and so these terms are not intended to necessarily refer to the L1 and L2 caches but could for example refer to L2 and L3 instead.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
  a first-level cache comprising a plurality of first-level cache entries for storing cached data;
  a second-level cache comprising a plurality of second-level cache entries for storing cached data; and
  cache control circuitry to:
    perform a first-level cache lookup of the first-level cache based on a lookup address, to determine whether the first-level cache stores valid cached data corresponding to the lookup address;
    when lookup hint information associated with the lookup address is available, determine based on the lookup hint information whether to activate or deactivate a second-level cache lookup of the second-level cache, the lookup hint information indicative of whether the second-level cache is predicted to store valid cached data associated with the lookup address; and
    when the second-level cache lookup is activated, perform the second-level cache lookup of the second-level cache based on the lookup address to determine whether the second-level cache stores valid cached data corresponding to the lookup address; and
  prediction circuitry to determine a predicted behavior associated with the lookup address based on prediction information indicated by valid cached data identified as corresponding to the lookup address in at least one of the first-level cache lookup and the second-level cache lookup.

2. The apparatus according to claim 1, in which the lookup hint information comprises further cache hit prediction information indicative of whether, in a case when the first-level cache lookup identifies that the first-level cache stores valid cached data corresponding to the lookup address, the second-level cache is predicted to store further valid cached data corresponding to the lookup address.

3. The apparatus according to claim 2, in which the cache control circuitry is configured to perform the second-level cache lookup when the further cache hit prediction information indicates that the second-level cache is predicted to store the further valid cached data corresponding to the lookup address, even when the first-level cache lookup identifies that the first-level cache stores valid cached data corresponding to the lookup address.

4. The apparatus according to claim 2, in which the further cache hit prediction information is encoded in a portion of a first-level cache entry corresponding to the lookup address.

5. The apparatus according to claim 2, in which, in response to the second-level cache lookup being activated based on the further cache hit prediction information indicating that the second-level cache is predicted to store the further valid cached data corresponding to the lookup address and the second-level cache lookup identifying that no valid cached data associated with the lookup address is stored in the second-level cache, the cache control circuitry is configured to clear the further cache hit prediction information to indicate that the second-level cache is not predicted to store the further valid cached data corresponding to the lookup address.

6. The apparatus according to claim 1, in which the lookup hint information comprises further cache miss prediction information indicative of whether, in a case when the first-level cache lookup identifies a cache miss when no valid cached data corresponding to the lookup address is stored in the first-level cache, the second-level cache is also predicted to store no valid cached data corresponding to the lookup address.

7. The apparatus according to claim 6, in which the cache control circuitry is configured to deactivate the second-level cache lookup when the first-level cache lookup identifies the cache miss, the further cache miss prediction information is available for the lookup address, and the further cache miss prediction information specifies that the second-level cache is predicted to store no valid cached data corresponding to the lookup address.

8. The apparatus according to claim 6, in which, when available, the further cache miss prediction information indicates a prediction that the second-level cache is predicted to store no valid cached data corresponding to the lookup address.

9. The apparatus according to claim 8, in which in response to allocation of new valid cached data for a given address to the first-level cache when the further cache miss prediction information for the given address is available, the cache control circuitry is configured to clear the further cache miss prediction information associated with the given address to indicate that the further cache miss prediction information is no longer available for the given address.

10. The apparatus according to claim 8, in which the further cache miss prediction information for the lookup address comprises a dummy first-level cache entry associated with the lookup address which is a valid first-level cache entry corresponding to the lookup address but does not provide valid cached data.

11. The apparatus according to claim 10, in which the cache control circuitry is configured to select, from among a plurality of candidate first-level cache entries, a victim first-level cache entry to be evicted from the first-level cache, and the cache control circuitry is configured to select the victim first-level cache entry according to an order of preference which, when the plurality of candidate first-level cache entries include a dummy first-level cache entry, favours selection of the dummy first-level cache entry as the victim first-level cache entry in preference to a candidate first-level cache entry providing valid cached data.

12. The apparatus according to claim 1, in which the cache control circuitry is configured to determine, when the lookup hint information is not available for the lookup address, that:

the second-level cache lookup should be deactivated when the first-level cache lookup identifies that the first-level cache stores valid cached data corresponding to the lookup address; and the second-level cache lookup should be activated when the first-level cache lookup identifies that no valid cached data corresponding to the lookup address is stored in the first-level cache.

13. The apparatus according to claim 1, in which the cache control circuitry is configured to determine based on the first-level cache lookup whether the lookup hint information is available, and when the lookup hint information is available, to obtain the lookup hint information associated with the lookup address from a first-level cache entry identified as corresponding to the lookup address in the first-level cache lookup.

14. The apparatus according to claim 1, comprising a lookup hint storage structure to store lookup hint information for a subset of addresses, where the lookup hint storage structure is separate from the first-level cache, and the cache control circuitry is configured to perform a lookup hint lookup of the lookup hint storage structure based on the lookup address to determine whether the lookup hint information is available for the lookup address.

15. The apparatus according to claim 1, in which the prediction circuitry is configured to determine the predicted behaviour based on a default prediction when the first-level cache lookup determines that no valid cached data corresponding to the lookup address is stored in the first-level cache and the second-level cache lookup for the lookup address is either deactivated or is activated but determines that no valid cached data corresponding to the lookup address is stored in the second-level cache.

16. The apparatus according to claim 1, in which the prediction circuitry comprises branch prediction circuitry to determine a predicted branch instruction behaviour associated with the lookup address based on branch prediction information indicated by valid cached data identified as corresponding to the lookup address in at least one of the first-level cache lookup and the second-level cache lookup.

17. The apparatus according to claim 1, in which the prediction circuitry comprises branch prediction circuitry to determine a predicted branch target address for a first taken branch instruction predicted to occur within a block of one or more instructions associated with the lookup address, based on branch target buffer information indicated by valid cached data identified as corresponding to the lookup address in at least one of the first-level cache lookup and the second-level cache lookup.

18. An apparatus comprising:
a first-level cache comprising a plurality of first-level cache entries for storing cached data;
a second-level cache comprising a plurality of second-level cache entries for storing cached data; and
cache control circuitry to:
perform a first-level cache lookup of the first-level cache based on a lookup address, to determine whether the first-level cache stores valid cached data corresponding to the lookup address;
when lookup hint information associated with the lookup address is available, determine based on the lookup hint information whether to activate or deactivate a second-level cache lookup of the second-level cache, the lookup hint information indicative of whether the second-level cache is predicted to store valid cached data associated with the lookup address; and when the second-level cache lookup is activated, perform the second-level cache lookup of the second-level cache based on the lookup address to determine whether the second-level cache stores valid cached data corresponding to the lookup address; in which:

the cache control circuitry is configured to determine based on the first-level cache lookup whether the lookup hint information is available, and when the lookup hint information is available, to obtain the lookup hint information associated with the lookup address from a first-level cache entry identified as corresponding to the lookup address in the first-level cache lookup.

19. An apparatus comprising:

a first-level cache comprising a plurality of first-level cache entries for storing cached data;

a second-level cache comprising a plurality of second-level cache entries for storing cached data; and cache control circuitry to:
  perform a first-level cache lookup of the first-level cache based on a lookup address, to determine whether the first-level cache stores valid cached data corresponding to the lookup address;

when lookup hint information associated with the lookup address is available, determine based on the lookup hint information whether to activate or deactivate a second-level cache lookup of the second-level cache, the lookup hint information indicative of whether the second-level cache is predicted to store valid cached data associated with the lookup address; and when the second-level cache lookup is activated, perform the second-level cache lookup of the second-level cache based on the lookup address to determine whether the second-level cache stores valid cached data corresponding to the lookup address; and branch prediction circuitry to determine a predicted branch instruction behavior associated with the lookup address based on branch prediction information indicated by valid cached data identified as corresponding to the lookup address in at least one of the first-level cache lookup and the second-level cache lookup.

* * * * *